(12) United States Patent
Znamenskiy et al.

(10) Patent No.: US 8,675,132 B2
(45) Date of Patent: Mar. 18, 2014

(54) SYSTEM AND METHOD FOR THE DETECTION OF DE-INTERLACING OF SCALED VIDEO

(75) Inventors: Dmitry Znamenskiy, Eindhoven (NL); Claus Nico Cordes, Eindhoven (NL)

(73) Assignee: NXP B.V., Eindhoven (NL)

( * ) Notice: Subject to any disclaimer, the term of this patent is extended or adjusted under 35 U.S.C. 154(b) by 120 days.

(21) Appl. No.: 13/356,931

(22) Filed: Jan. 24, 2012

(65) Prior Publication Data

US 2012/0120252 A1    May 17, 2012

Related U.S. Application Data

(62) Division of application No. 12/333,483, filed on Dec. 12, 2008, now Pat. No. 8,125,524.

(51) Int. Cl.
*H04N 5/46* (2006.01)
*H04N 7/01* (2006.01)
*H04N 11/20* (2006.01)

(52) U.S. Cl.
USPC ........................... 348/558; 348/449; 348/448

(58) Field of Classification Search
CPC ............ H04N 5/46; H04N 7/01; H04N 11/20
USPC .......................................... 348/558, 441–459
See application file for complete search history.

(56) References Cited

U.S. PATENT DOCUMENTS

| | | | |
|---|---|---|---|
| 6,055,018 A | 4/2000 | Swan | |
| 2002/0080284 A1* | 6/2002 | Kim et al. | ..................... 348/700 |
| 2003/0076881 A1 | 4/2003 | Akiyoshi et al. | |
| 2005/0110901 A1 | 5/2005 | Alfonso et al. | |
| 2005/0179814 A1 | 8/2005 | Pau et al. | |
| 2005/0286629 A1 | 12/2005 | Dumitras et al. | |
| 2006/0029134 A1 | 2/2006 | Winder et al. | |
| 2006/0285010 A1 | 12/2006 | Wang et al. | |
| 2008/0062307 A1* | 3/2008 | Zhai et al. | ..................... 348/448 |
| 2008/0246874 A1 | 10/2008 | Hahn et al. | |

* cited by examiner

*Primary Examiner* — Michael Lee

(57) ABSTRACT

A system, apparatus, and method are provided for a video detector that computes a measure of how much a given video content resembles one of a de-interlaced video content or a progressive video content. More particularly, the present invention determines the position of original and interpolated lines and the scaling factor of an input content whenever that content was scaled after de-interlacing.

18 Claims, 9 Drawing Sheets

| SCALING-INTERVAL | DISCRIMINATING-FUNCTIONS |
|---|---|
| [1.0, 1.07] | $D_{1,1}(y,n)$ AND $D_{3,1}(y,n)$ |
| [1.25, 1.34] | $D_{1,1.5}(y,n)$ AND $D_{3,1}(y,n)$ |
| [1.5, 1.61] | $D_{1,1.5}(y,n)$ AND $D_{3,2}(y,n)$ |
| [1.87, 2.01] | $D_{1,2}(y,n)$ AND $D_{3,2}(y,n)$ |
| [2.25, 2.41] | $D_{1,2.5}(y,n)$ AND $D_{3,2}(y,n)$ |

SCALING INTERVAL AND CORRESPONDING
DISCRIMINATING FUNCTIONS DEFINED ON INTEGER GRID

FIG. 8a1
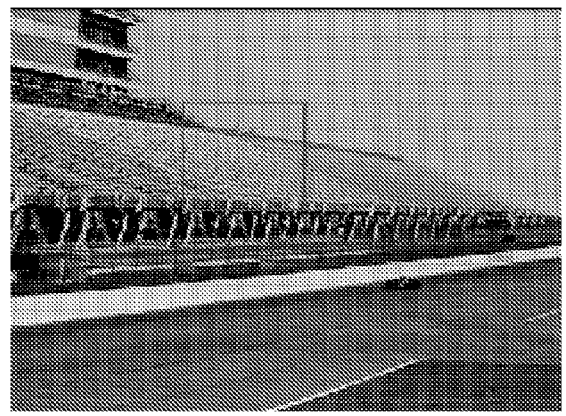
FIG. 8b2

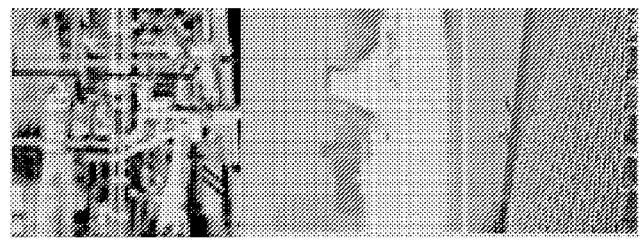
FIG. 8b4
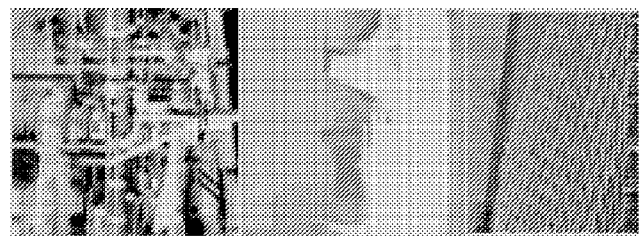
FIG. 8b3
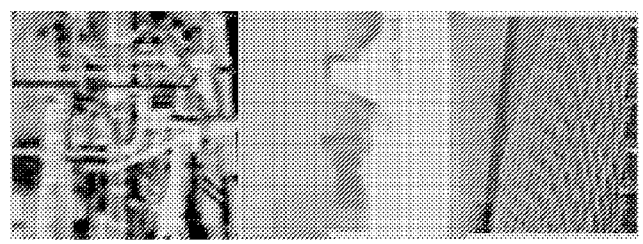
FIG. 8b2
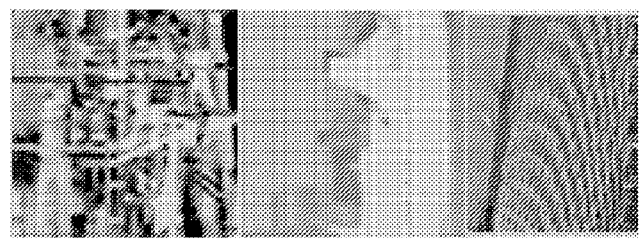
FIG. 8b1

SYSTEM AND METHOD FOR THE DETECTION OF DE-INTERLACING OF SCALED VIDEO

CROSS-REFERENCE TO RELATED APPLICATIONS

This application is a division of co-pending application Ser. No. 12/333,483, filed on Dec. 12, 2008, the contents of which are incorporated by reference herein.

The present invention relates to a system and method for a video detector that computes a measure of how much a given video content resembles one of a de-interlaced video content or a progressive video content. More particularly, the present invention determines the position of original and interpolated lines and the scaling factor of an input content whenever that content was scaled after de-interlacing.

Interlacing is widely used to reduce the bandwidth of video signals. It has become an integral part of PAL and NTSC standards and is included in some HD standards. The basic idea of interlacing is simple: by alternating the transmission of even and odd lines of consecutive frames, the resulting bandwidth is halved with respect to the original, so-called progressive, video signal.

The concept of de-interlacing, i.e. the reverse process in which the missing lines are restored, appeared with the first CRT displays with doubled vertical resolution and became an essential part of the inherently progressive flat panel displays. However, the quality of modern de-interlacers varies greatly. With the de-interlacer being typically located in the front of the video chain, any artifacts generated here will greatly affect algorithms in the back-end. Furthermore, with the video chain being split over various devices, it is typically not known to video processing algorithms whether or not the content was previously de-interlaced, and if so, what quality and/or artifacts to expect. In the case of external de-interlacers, such as, e.g., set-top boxes or DVD players with progressive output, such information is lost even to the front-end video processing.

Any knowledge on the type of video signal, i.e. de-interlaced or progressive, and the actual quality of the de-interlaced result is therefore highly desirable. Previous work has addressed the latter problem by proposing a no-reference metric for the quality of de-interlacing. However, the proposed algorithm was limited to very basic de-interlacing by line-insertion. In this invention, a simple and low-cost system and method is provided that is able to classify the input as de-interlaced or progressive for a broad range of de-interlacers without the need for a reference signal. Moreover, the current invention is robust for spatial scaling and therefore referred to as a DISC detector (De-Interlaced and SCaled) detector. The system and method of the present invention also indicate the positions of original and interpolated lines and the scaling factor.

The DISC detector can be used in a video chain as, e.g., as depicted in FIG. 1 to provide the control signal to the so-called video engine. However, many other possibilities for integrating the DISC detector exist. FIG. 1 illustrates only one such possibility.

The DISC detector of the present invention is based upon two simple observations:
 a. Given the fact that interpolated lines are computed from original lines, their entropy is typically lower; and
 b. The positions of original and interpolated lines are complementary and their positions alternate from frame to frame, i.e. their positions form a checkerboard pattern on the vertical-temporal plane.

The first observation can be illustrated by considering the de-interlaced output of a mainstream de-interlacer. If one separates the de-interlaced output into two images, one consisting of the original lines and one consisting of the interpolated lines, then one can clearly observe that the second image is more blurred, i.e., even and odd lines in the imperfectly de-interlaced frames have different high-frequency statistics. Hence, certain discriminating functions should exist that can discriminate between original and interpolated lines. For example, the following function computed on the positions original lines gives, in general higher values than on interpolated lines $$D(y, n) = D_1(y, n) + c_1 * D_2(y, n) + c_2 * D_3(y, n),$$

where $$D_1(y, n) = \frac{1}{w} \sum_x |F(x, y, n) - F(x, y-2, n)|,$$

$$D_2(y, n) = \frac{1}{w} \sum_x |F(x, y, n) - F(x, y-1, n)|,$$

$$D_3(y, n) = \frac{1}{w} \sum_x |F(x, y, n) - F(x, y, n-1)|,$$

and where $c_1$ and $c_2$ are some parameters.

Experimental validation shows that $D(y,n)$ gives consistently higher values on original lines of de-interlaced content and therefore using the following measure of de-interlacing quality is suggested:

$$M = |S|^{-1} \left| \sum_{(y,n) \in S} D(y, n) \cdot (-1)^{(y+n)} \right|,$$

where S is some sub-grid of vertical-temporal pixel grid such that S contains the equal number of points from odd and even grids.

The measure is now generalized to scaled video signals as follows. If the video is de-interlaced and scaled factor $\beta$ then for any $\alpha$ sufficiently close to $\beta$, $D(y,n)$ as the function of y, should contain essential amount of the highest spatial-temporal harmonic $$g(\alpha, y, n) = c_\alpha \exp(i\pi(\alpha \cdot y + n)),$$

where $c_\alpha$ is the amplitude coefficient which depends on the cropping method (if the video was cropped after scaling) and the visibility of de-interlacing artifacts.

In order to find the scaling ratio $c_\alpha$ of de-interlaced video we evaluate the amplitude of the scaling spectrum $\rho(\alpha)$ $$\rho(\alpha) = |S|^{-1} \left\| \sum_{(y,n) \in S} D(y, n) \cdot \exp(-i\pi(\alpha \cdot y + n)) \right\|,$$

for a given set/interval of candidate $\alpha$ where S is some sub-grid of vertical-temporal pixel grid such that S contains the equal number of points from odd and even grids. In another alternative exemplary embodiment the discrimination between de-interlaced and progressive video can be made on the basis of variance $\sigma$ and the absolute maximum M of the power spectrum $\rho(\alpha)$. If the video is de-interlaced and scaled with factor $\beta$ then the scaling spectrum $\rho(\alpha)$ as function of a should have a well pronounced peak at $\alpha = \beta$, and hence $\sigma$ is small and M is high. For originally progressive sequences, the spectrum is flat, and therefore σ is large and M is relatively low, as illustrated in FIG. 6.

Based on these experimental results, we propose the following discriminating measure $$DISC_\mu = (1+(10^{-3.35}*\sigma^4/M)^2)^{-1},$$

which represents deviations from the discriminating line on FIG. 2? The measure takes values in [0, 0.5] for 96% of tested progressive frames, and values in (0.5, 1] for 94% of de-interlaced frames providing quite robust classification.

The provided DISC detector has been successfully tested in a number of video processing applications. Some of them are described below, though the list is not exhaustive:

1) Film cadence detection. In film cadence detection, it is essential to identify the presence and location of repeated frames. Unfortunately, due to poor de-interlacing, repeated frames can differ with respect to each other. Together with compression artifacts, this makes film detection quite a challenging task. Since the DISC value indicates the amount of de-interlacing artifacts, it can be used to determine how much frame difference can be tolerated to classify two de-interlaced frames as a repeat.

2) Sharpness enhancement control. If a sharpness enhancement algorithm is applied to a video with visible de-interlacing artifacts, it clearly increases the sharpness of the artifacts as well. Since the DISC value correlates with visibility of de-interlacing artifacts, it can be used to adjust the parameters of sharpness enhancement algorithms.

3) Post-processing of film content. For poorly de-interlaced film content, improve the quality can be improved by re-de-interlacing. Since the DISC detector provides the positions of original lines, repeated frames can be improved by line-wise averaging of them with weights proportional to the proximity to original lines in respective frames. Although scaling prevents a perfect reconstruction of the film content, experiments have shown significant improvements in the case of up-scaled video content due to overscan;

4) Quality evaluation. Since the DISC value correlates with visibility of de-interlacing artifacts, it can be used for comparison of different de-interlacing techniques and for quality evaluation of particular de-interlacers, see FIG. 7; see FIGS. 7a-7c;

The detector can be used in various applications and such as other interesting applications that are possible include:

5) Re-(de)-interlacing. Suppose the front end receives a video in progressive format and has a good de-interlacer on board. It is possible to tune the DISC detector such that it can robustly identify whether the video is occasionally de-interlaced with pure line insertion or pure line repetition. Then if there is no scaling detected, it is possible to interlace video (select original lines) and re-de-interlace it with the de-interlacer of the present invention.

6) Video compression. The DISC detector can be used to select the optimal compression strategy. For example, if the video is poorly de-interlaced, at least one of a higher compression ratios and extra quality can be achieved if it is compressed as interlaced video. Note that proper re-interlacing is only possible for non-scaled video, as it requires the positions of original and interpolated lines to be located on an integer grid.

Many of the attendant features will be more readily appreciated by referring to the following detailed description considered in connection with the accompanying drawings. Note that the file of this patent contains at least one drawing executed in color. Copies of this patent with color drawings(s) will be provided by the Patent and Trademark Office upon request and payment of the necessary fee.

FIG. 1 is an example usage of the DISC detector according to the present invention in a conventional video chain; and FIG. 2 illustrate characteristics of a spectra for 60 video sequences each of ~100 frames scaled by a factor of 0.96, the light gray points correspond to 30 sequences de-interlaced with a state-of-the-art de-interlacer, the dark gray points to 30 originally progressive sequences, and the line log(y)=2 log (x)−3.35 efficiently discriminates between de-interlaced and progressive content since only 4% of progressive, and 6% if de-interlaces frames are misclassified;

FIG. 3a is an example frame from a de-interlaced sequence; FIG. 3b is an enlargement of parts of FIG. 3a consisting of original lines only; FIG. 3c is an enlargement of parts of FIG. 3a consisting of restored lines only. Clearly visible is that FIG. 3c is substantially more blurred than FIG. 31b;

Figure 1:
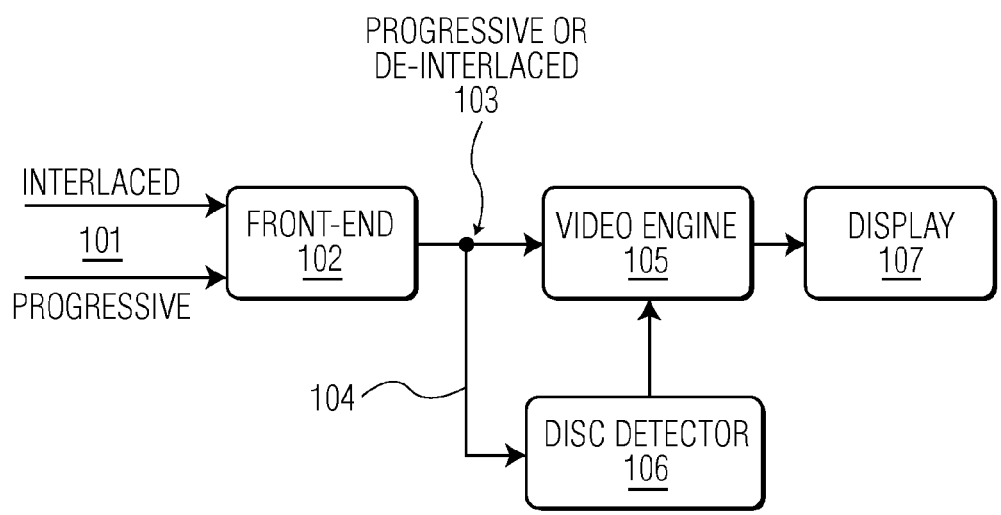
Figure 2:
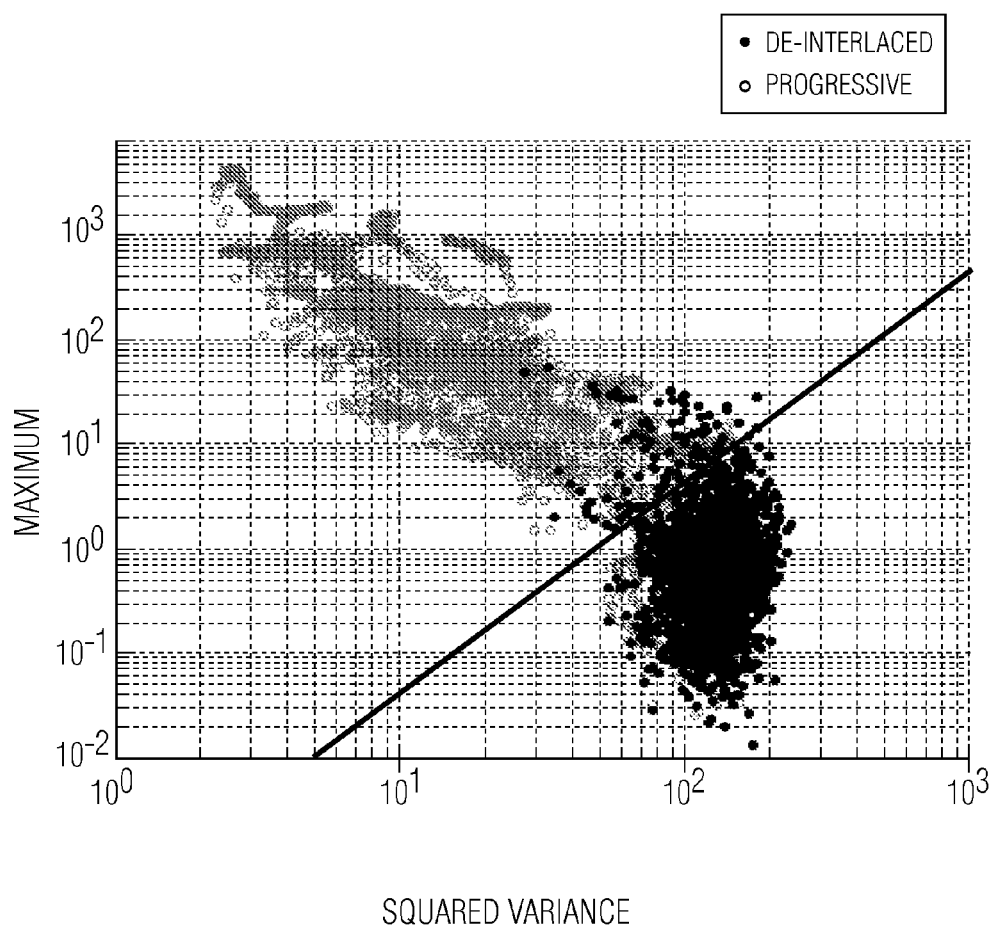
Figure 3A:
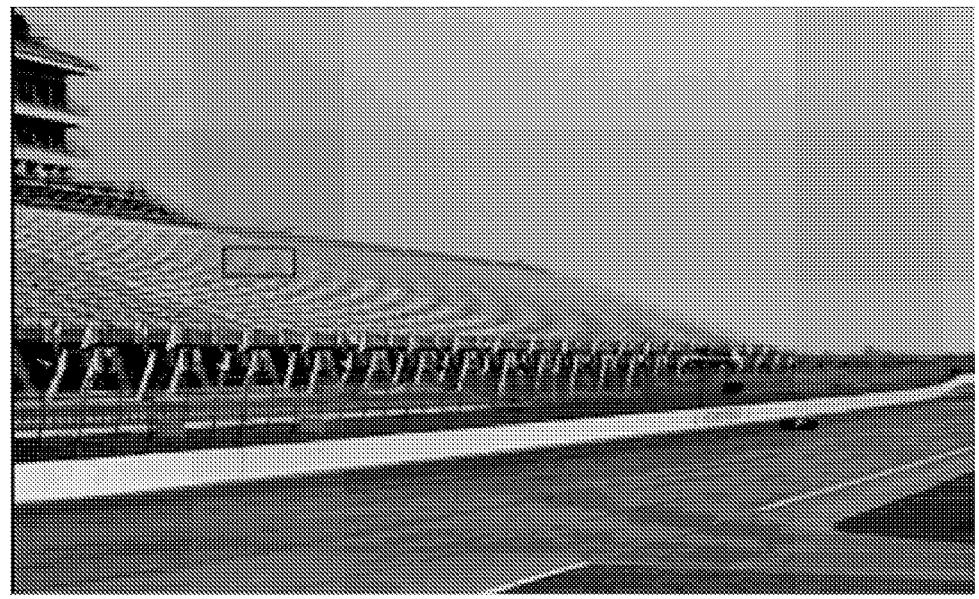
Figure 3B:
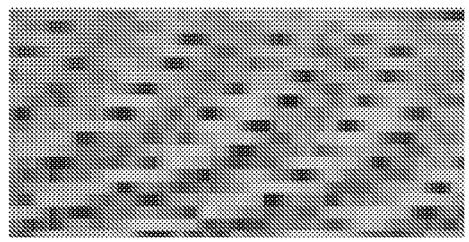
Figure 3C:
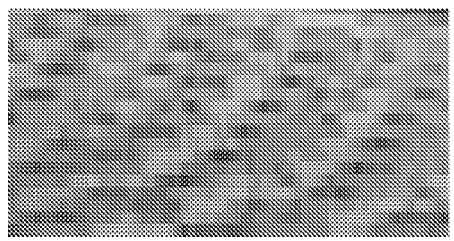
Figures 4, 5:
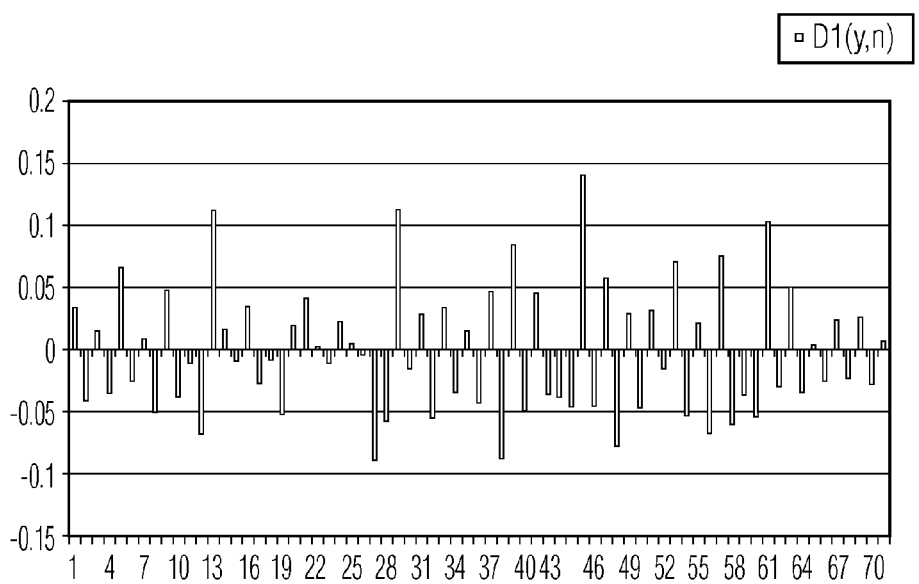
FIG. 4 illustrates an example of a table of scaling interval and corresponding discrimination functions defined on an integer grid.
FIG. 5 is an example of a sample of D1(y,n) computed on first 80 lines of a de-interlaced image. D1(y,n) computed on original lines gives, in general, positive values while D1(y,n) computed on interpolated lines gives in general, negative values.
Figure 6:
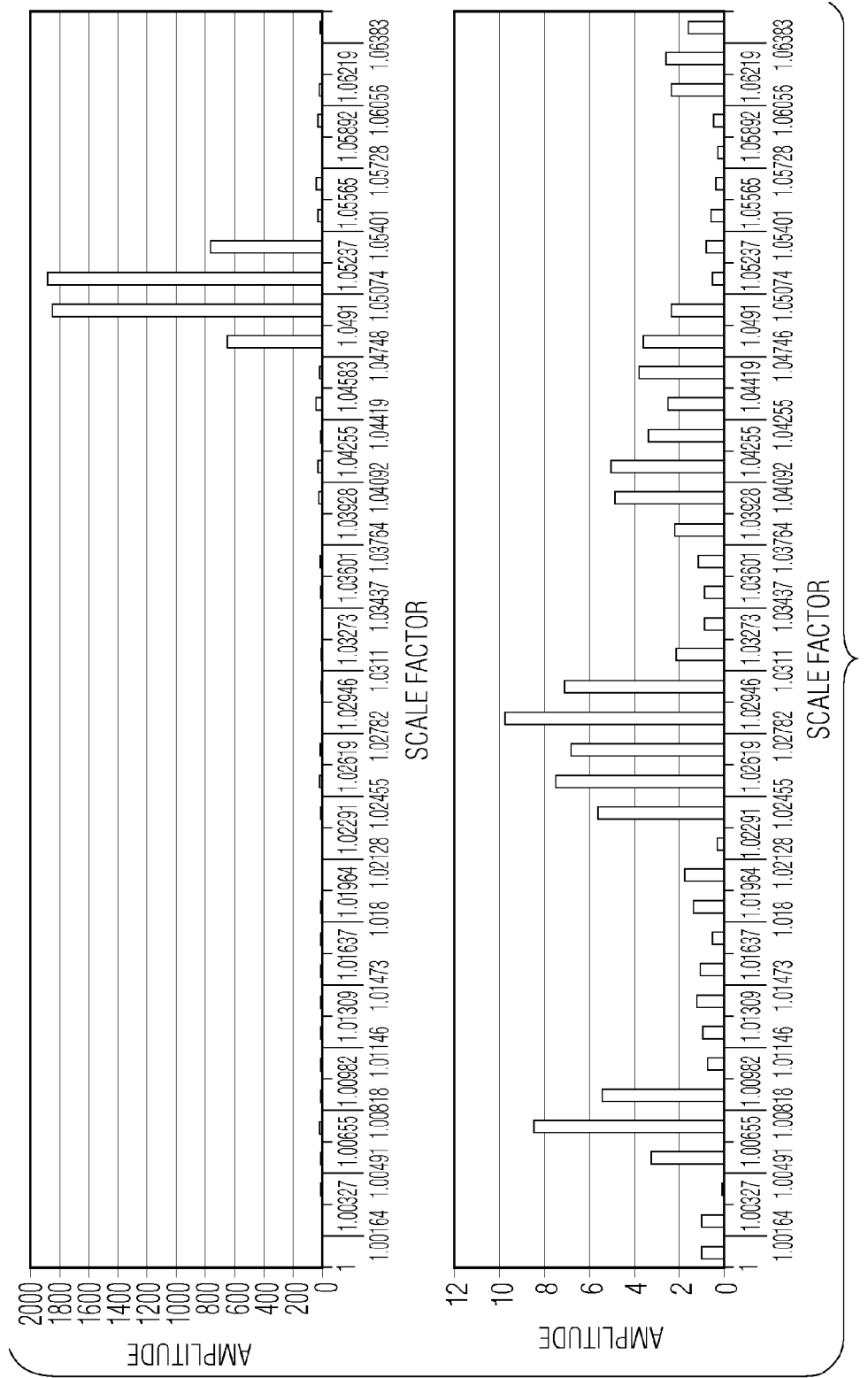
Figure 7C:
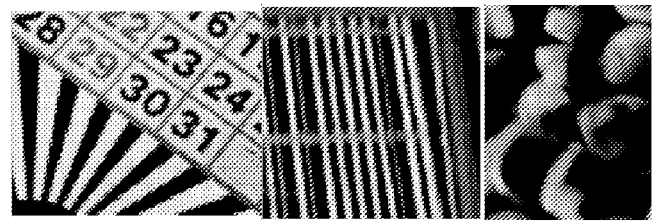
Figure 7B:
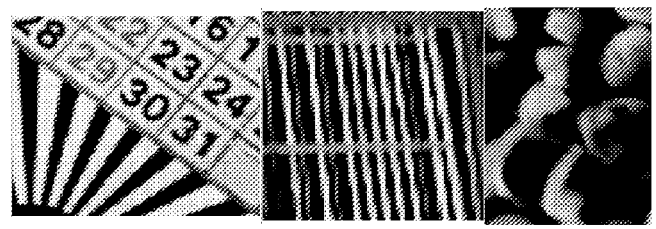
Figure 7A:
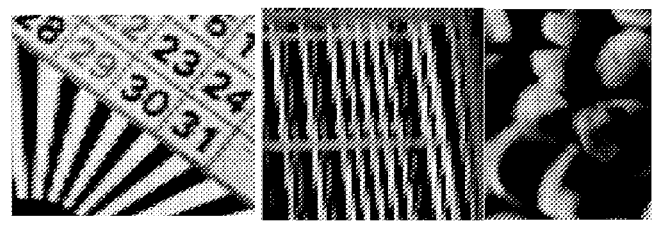
Figure 9:
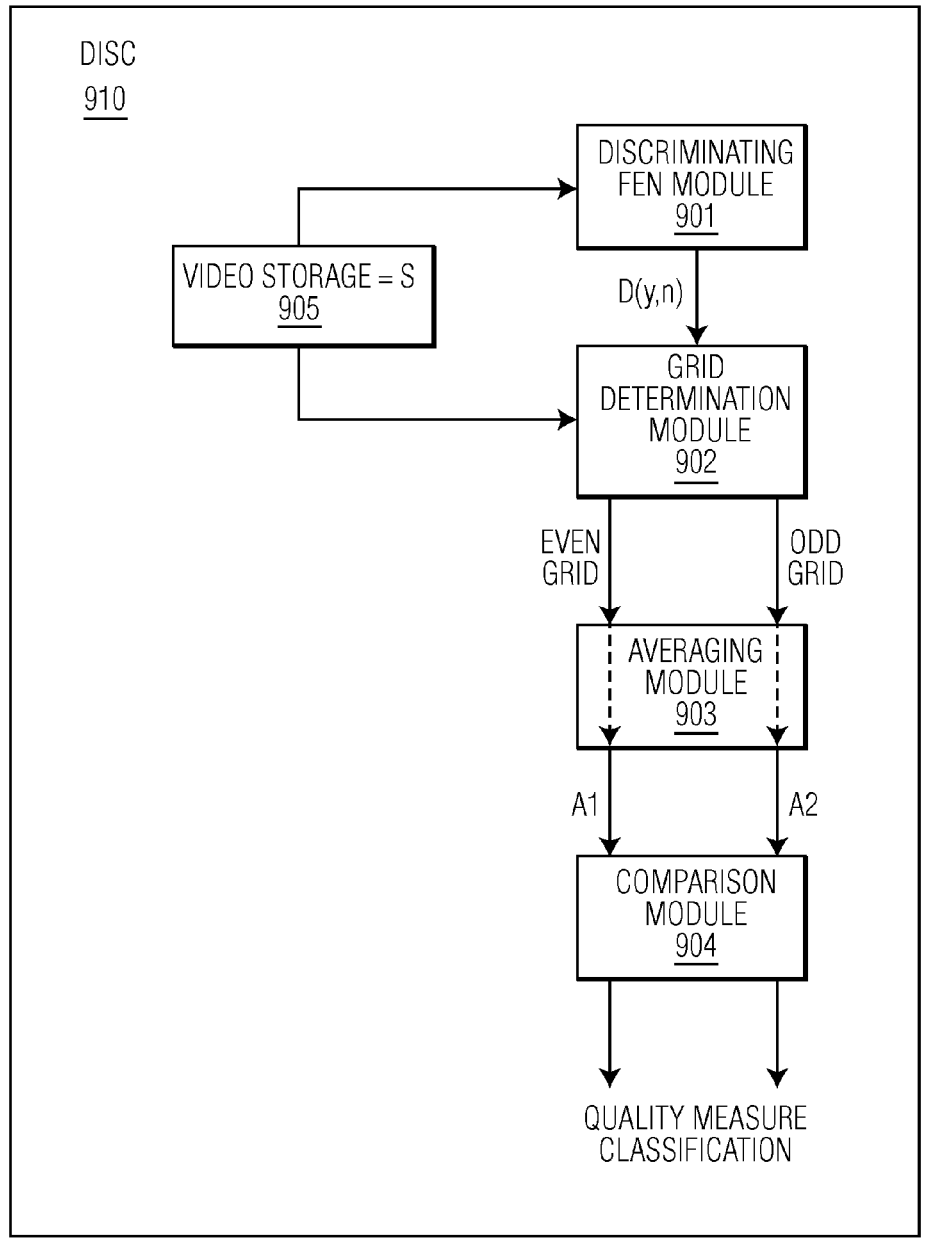

FIG. 6 is an example of two scaling spectra of a sample frame sequence, scaled with ratio 1.05. where top: de-interlaced with a state-of-the-art de-interlacer; bottom: original progressive and the top spectrum is very narrow, the dominant frequency has large amplitude≈(1900 against≈10, the maximal amplitude of the spectrum of original progressive frame), and it correspond to the scaling ratio 1.05;

FIG. 7 illustrates FIGS. 7a-7c illustrate an example of quality comparison of different de-interlacers: FIG. 7a depicting a line average with DISC value >0.9, FIG. 7b depicting a motion compensative de-interlacer with DISC value of 0.5, and FIG. 7c depicting the progressive original with DISC value <0.3 and it can be seen that in this case DISC value correlates with the visibility of de-interlacing artifacts;

FIG. 8a1 illustrates an example of original sequences in 2:2 film cadence with two segments indicated, and FIG. 8a2 illustrates a 3:2 film cadence with one segment;

FIG. 8b1 illustrates an example of the processing in the columns is, FIG. 8b2 depicts de-interlacing using a motion adaptive de-interlacer and subsequent scaling, FIG. 8b3 depicts when frames are averaged with their repeats, eliminating most of the detail flicker, FIG. 8b4 depicts (re)-de-interlacing using the DISC detector and the original progressive sequence;

FIG. 9 illustrates an example of an apparatus for the detection of de-interlaced vides, according to a first embodiment of the present invention.

A low-cost detector and detection method are provided that can classify video in progressive format as being de-interlaced or originally progressive. Experiments have confirmed the robustness of the detector and method of the present invention in discriminating between de-interlaced and progressive content, as well as its added value in the described applications.

A low-cost detector and detection method are provided that can classify video in progressive format as being de-interlaced or originally progressive. Experiments have confirmed the robustness of the detector and method of the present invention in discriminating between de-interlaced and progressive content, as well as its added value in the described applications.

Interlacing is widely used to reduce the bandwidth of video signals. It has become an integral part of PAL and NTSC standards and is included in some HD standards. The basic idea of interlacing is simple: by alternating the transmission of even and odd lines of consecutive frames, the resulting bandwidth is halved with respect to the original, so-called progressive, video signal.

The concept of de-interlacing, i.e. the reverse process in which the missing lines are restored, appeared with the first CRT displays with doubled vertical resolution and became an essential part of the inherently progressive flat panel displays. Basically, de-interlacing algorithms recreate missing lines from their existing spatial and/or temporal neighbors:

$$F_0(x, y, n) = F_i(x, y, n), \quad ((y+n) \bmod 2 = 0) \quad (1)$$
$$F(x, y, n), \quad \text{otherwise}$$

with F(x,y,n) being the pixels at spatial position (x,y), field number n existing only on vertical positions ((y+n) mod 2=0), and $F_i$(x,y,n) being the interpolated pixels. In general, de-interlacing is a particularly efficient way of increasing the spatial resolution of video, as advanced de-interlacers are able to double the vertical resolution of the video signal by recovering the original information.

However, the quality of modern de-interlacers varies greatly. With the de-interlacer being typically located in the front of the video chain, any artifacts generated here will greatly affect algorithms in the rest of the video chain. Furthermore, with the video chain being split over various devices and/or IC's, it is typically not known for video processing algorithms if the content was previously de-interlaced, and if so, what quality and/or artifacts to expect. In the case of external de-interlacers, such as e.g. set-top boxes or DVD players with progressive output, such information is lost even to the front-end video processing.

Any knowledge on the type of video signal, i.e. de-interlaced or progressive, and the actual quality of the de-interlaced result is therefore highly desirable. The present invention provides a low-cost system and method which is able to classify the input as de-interlaced or progressive for a broad range of de-interlacers without the need for a reference signal. Moreover, this algorithm is robust for spatial scaling and therefore referred to as DISC detector (De-Interlaced and SCaled). Furthermore, it can indicate the position of original and interpolated lines and the scaling factor.

In the following detailed disclosure the detector is first described followed by a discussion of its results. Possible application areas are then presented.

Based on the observation that de-interlacing quality has a large impact on the overall quality of the video chain, it becomes apparent that a detector is desirable that indicates how much a given video signal resembles true progressive video content. If it is also assumed that higher de-interlacing quality results in a higher resemblance of the de-interlaced signal to the original progressive signal, such a detector would not only allow for the differentiation of progressive and de-interlaced content, but also automatically give an indication on the quality of the de-interlacing.

It seems most obvious to base such a detector upon the calculation of the Mean Square Error (MSE) between a given de-interlaced video signal and an original progressive video signal. However, such a detector is unsuitable for real-time applications, as the calculation of the MSE requires a reference video signal. By contrast, a no-reference detector does not require any original reference, and can therefore be included in a real-time system. This enables the usage of the detector in video chains as, e.g., depicted in FIG. 1, where the output of the detector is used in the so-called video engine.

The DISC detector which is described in the following sections, is a no-reference detector that is based upon two simple observations:

1. Given the fact that interpolated lines are computed from original lines, their entropy is typically lower.

2. The positions of original and interpolated lines are complementary and their positions alternate from frame to frame, i.e. their positions form a checkerboard pattern on the vertical-temporal plane.

The former observation is based upon the fact that interpolated lines are computed from the original lines according to the de-interlacing algorithm, and therefore basically contain less information. This means that the interpolated pixels should be, in general, more correlated with their neighbors than the original pixels, and hence, the statistical characteristics of the interpolated pixel grid should, in general, differ from the statistical characteristics of the original grid. Moreover, the larger this difference is, the higher the chance that de-interlacing artifacts become visible. On the other hand, in originally progressive video signals, there should be no noticeable statistical difference between even and odd grids.

The latter observation suggests to divide all lines of a video sequence in two vertical-temporal grids, one so-called even grid $\{(y,n)|(y+n) \bmod 2=0\}$, where y is the line number and n is the frame, is the grid of original lines, and the complementary odd grid $\{(y,n)|(y+n) \bmod 2=1\}$. If the positions of original lines fall on the even grid, then the positions of interpolated lines fall on odd grid, and visa versa, if the even grid is the grid of interpolated lines then the odd grid is the grid of original lines. The above observations lead to the following conclusion: if a discriminating function exists such that the average of this function computed on the even grid differs significantly from the average of this function computed on then odd grid, then the video is de-interlaced with a high probability. Furthermore, the larger this difference is, the higher the chance that de-interlacing artifacts become visible.

The above concept can be illustrated by considering the de-interlaced output of a mid-range de-interlacer as shown in FIGS. 3a-3c. If one separates the de-interlaced output into two images, one consisting of the original lines and one consisting of the interpolated lines, then one can clearly observe that the second image is more blurred, i.e. even and odd lines in the imperfectly de-interlaced frames have different high-frequency statistics.

The simplest discriminating function which can capture the differences depicted in FIGS. 3a-3c, is in essence a vertical high-pass filter as defined by:

$$D(y, n) = \frac{1}{w} \sum_x |F_0(x, y, n) - F_0(x, y-2, n)|,$$

where w is the image width. However, the following modification results in a higher contrast or differentiation $$D_1(y, n) = \frac{L}{w} \sum_{x \in L N_o} (\text{sign}(\Delta_{-2,0}(x, y, n)) - \text{sign}(\Delta_{-2,0}(x, y+1, n)))$$

where w is the image width; in $x \in L \cdot N_o$ we take $x=0, L, 2L, 3L, \ldots$; sign(z) is the sign function:

$$\text{sign}(z) = \begin{cases} 1, & z > 0, \\ 0, & z = 0, \\ -1, & z < 0, \end{cases}$$

and $\Delta_{a,b}(x,y,n)$ is the local difference defined as:

$$\Delta_{a,b}(x, y, n) = \frac{1}{L}\sum_{j=0}^{L-1} |F_0(x+j, y, n) - F_0(x+j, y+a, n+b)|,$$

where L is experimentally derived as 3.

One can see that $D_1(y,n)$ is indeed derived from $D(y,n)$ since $D_1(y,n)$ is a normalized difference between $\Delta_{-2,0}(x,\cdot,n)$ computed on current line (y,n) and the line below (y+1,n), and since $\Delta_{-2,0}(x,y,n)$ is the localized version of $D(y,n)$ around horizontal position y. So we see that on original lines $\Delta_{-2,0}(x,\cdot,n)$ is, in general, larger, and hence $D_1(y,n)$ is positive, while on interpolated lines $\Delta_{-2,0}(x,\cdot,n)$ is, in general, smaller, and hence $D_1(y,n)$ is negative. This is illustrated in FIG. 5, which shows a sample of $D_1(y,n)$ computed on the first 80 lines of a de-interlaced image. Small vertical details in the image, however, can cause deviations from this rule.

From a practical point of view, $D_1(y,n)$ efficiently discriminates between the original and interpolated grids for the majority of de-interlacers. However, two rather primitive de-interlacers form the exception to this rule, as here the original and interpolated lines are identical modulo a spatial temporal shift:

1. Pure line insertion. In this de-interlacing method, the interpolated lines are copies of the lines with an identical vertical position in the previous image. For example, if the even grid is the original grid, then the interpolated samples in Equation (1) are defined by:

$$F_i(x,y,n) = F(x,y,n-1), (y,n) \text{ in odd grid}.$$

Since the two pixel grids, one consisting of even lines the other of odd lines, consist both of original lines (from different frames), the discriminating function $D_1(y,n)$ cannot discriminate them. However, the following discriminating function matches this de-interlacing method better:

$$D_2(y, n) = \frac{\sum_{x \in L N_o} \Delta_{0,-1}(x, y, n) + \varepsilon}{\sum_{x \in L N_o}\left(\Delta_{0,-1}(x, y, n) + \sum_{x \in L N_o} \Delta_{0,-1}(x, y+1, n)\right) + 2 \cdot \varepsilon} - 0.5.$$

Indeed, since $\Delta_{0,-1}(x,y,n)$ is zero, (or almost zero, depending on noise) on the interpolated grid $D_2(y,n)$ is, in general, negative on the interpolated grid. On the other hand, on the original grid, $D_2(y,n)$ is positive and proportional to inter-frame difference. Hence, if two consecutive frames are locally different, i.e. resulting in egg-slicing artifacts, then the averaging of $D_2(y,n)$ on the even grid differs severely from the averaging on the odd grid. In this case, the grid with the positive average is the original grid.

2. Pure line repetition. In this de-interlacing method, the interpolated lines are copies of the original lines above them. For example, if the even grid is the original grid, then the interpolated samples in Equation (1) are defined by:

$$F_i(x,y,n) = F(x,y-1,n), (y,n) \text{ in odd grid}.$$

Again, the discriminating function $D_1(y,n)$ cannot discriminate between the odd and even pixel grid. Moreover, $D_2(y,n)$ represents the local variation in the distance between the original lines of current and of previous frames, and hence can neither help in discriminating between original and interpolated lines. The proper discriminating function for the line repetition de-interlacer is:

$$D_3(y, n) = \frac{\sum_{x \in L N_o} \Delta_{-1,0}(x, y, n) + \varepsilon}{\sum_{x \in L N_o}\left(\Delta_{-1,0}(x, y, n) + \sum_{x \in L N_o} \Delta_{1,0}(x, y, n)\right) + 2 \cdot \varepsilon} - 0.5.$$

Observe that $\Delta_{-1,0}(x,y,n)$ is zero (or almost zero, depending on noise) on the interpolated grid, and hence again $D_2(y,n)$ is, in general, negative on the interpolated. On the original grid, $\Delta_{-1,0}(x,y,n)$ is positive and proportional to amount of high frequent detail in the image. Hence, if the frame is not completely homogeneous and stair-casing artifacts due to line repetition can be observed, then the averaging of this discriminating function on the original grid is positive and negative on the interpolated grid.

The individual discriminating functions can be combined into a combined discriminating function to cover a wide range of possible de-interlacing algorithms by the following summation:

$$D(y, n) = \sum_{i} \kappa_i D_i(y, n),$$

where $\kappa_i$ are mixing parameters. In practice, some contributions to $D_i(y,n)$ give, in general, higher values on the original grid, and the remaining $D_i(y,n)$ contribute as noise. The following experimentally derived values are provided: $\kappa_1=1$ and $\kappa_2, \kappa_3$ small enough, (e.g., $\kappa_2=\kappa_3=0.2$) to balance the inference between $D_i(y,n)$. Indeed, one can see that $D_2(y,n)$ and $D_3(y,n)$ are more efficient than $D_1(y,n)$ on the respectively de-interlaced content. Hence, if the video is de-interlaced with pure line-repetition or pure line-insertion, then, due to the efficiency of $D_2(y,n)$ and $D_3(y,n)$, we can achieve a high SNR even for small $\kappa_2$ and $\kappa_3$. If the video is de-interlaced with other methods, then $D_2(y,n)$ and $D_3(y,n)$ do not contribute much to noise due to the low $\kappa_2$ and $\kappa_3$.

It should be noted that both pure line insert and pure line repeat de-interlacers are quite rarely used since they produce highly visible artifacts in case of motion and vertical detail, respectively. Furthermore, motion adaptive de-interlacers, which combine line insert and line repeat depending on the detected motion, can be already be effectively detected with the discriminating function $D_1(y,n)$. This indeed justifies the above proposed values for $\kappa_i$.

Note that the implementation of $D_1(y,n)$ requires two line memories, $D_2(y,n)$ requires one frame memory, and $D_3(y,n)$ one line memory. Hence, to limit the implementation cost of the detector of the present invention, one could implement the present invention based purely on $D_1(y,n)$, or $D_1(y,n)$ and $D_3(y,n)$.

Since the average of $D(y,n)$ computed on the even grid differs significantly from the average of this function computed on then odd grid we suggest you use the following measure of de-interlacing quality $$M = |S|^{-1} \left| \sum_{(y,n) \in S} D(y, n) \cdot (-1)^{(y+n)} \right|,$$

where S is some sub-grid of vertical-temporal pixel grid such that S contains the equal number of points from odd and even grids. The formula above returns one number for a given video sequence. For streaming applications it makes sense to compute the de-interlacing quality measure recursively as $$M_{n+1} = \left| (1-\varepsilon) \cdot M_n + \varepsilon \cdot |S_{n+1}|^{-1} \sum_{(y,n) \in S_{n+1}} D(y,n) \cdot (-1)^{(y+n)} \right|,$$

where $S_n$ is some sub-grid of the current frame and $\varepsilon \in (0,1]$ is the temporal consistency parameter. If $\varepsilon$ is set close to one then $M_n$ indicates only the quality measure for current frame, if $\varepsilon$ is smaller than one, $M_n$ also takes previous frames into account.

The invention is generalized to scaled video signals as follows. Due to the scaling, the difference between the original and progressive lines changes. Therefore, the scaling should be adjusted to the discrimination functions $D_i(y,n)$. In order to do this, for scaling factor $\alpha$, we replace $\Delta_{a,b}(x,y,n)$ in $D_i(y,n)$ by its scaled analog $\Delta_{\alpha \cdot a,b}(x,y,n)$ where interpolation is used to obtain image values at the non-integer positions. The discriminating functions $D_1(y,n)$, $D_2(y,n)$ and $D_3(y,n)$ become $$D_{1,\alpha}(y, n) = \frac{L}{w} \sum_{x \in L \cdot N_o} (\text{sign}(\Delta_{-2 \cdot \alpha, 0}(x, y, n)) - \text{sign}(\Delta_{-2 \cdot \alpha, 0}(x, y+1, n))),$$

$$D_{2,\alpha}(y, n) = \frac{\sum_{x \in L \cdot N_o} \Delta_{0,-1}(x, y, n) + \varepsilon}{\sum_{x \in L \cdot N_o} \left( \Delta_{0,-1}(x, y, n) + \sum_{x \in L \cdot N_o} \Delta_{0,-1}(x, y+\alpha, n) \right) + 2 \cdot \varepsilon} - 0.5,$$

$$D_{3,\alpha}(y, n) = \frac{\sum_{x \in L \cdot N_o} \Delta_{-\alpha, 0}(x, y, n) + \varepsilon}{\sum_{x \in L \cdot N_o} \left( \Delta_{-\alpha, 0}(x, y, n) + \sum_{x \in L \cdot N_o} \Delta_{\alpha, 0}(x, y, n) \right) + 2 \cdot \varepsilon} - 0.5.$$

Observe that the video vertically scaled with coefficient $\beta$ can be detected by discriminating functions $D_{i,\alpha}(y,n)$, if $\alpha$ is sufficiently close to $\beta$. This allows us to use only discriminating functions $D_{i,\alpha\alpha}(y,n)$ defined on integer grid. For practical purposes, it is sufficient to consider a corresponding to 0%-7% overscan for SD material, and the overscan combined with possible up-scaling from 576p/480p/720p to 720p/1080p lines for HD material. This provides the following intervals of interest for $\alpha$. It is [1.0, 1.07] for SD, [1.0, 1.07], [1.25, 1.34] and [1.5, 1.61] for 720p, and [1.0, 1.07], [1.5, 1.61], [1.87, 2.01] and [2.25, 2.41] for 1080p. Since for any $\alpha$ discriminating functions (8) are allowed to take image values at the nearest integer positions without much loss in robustness, for every interval of interest, there can be found a fixed set of most suitable discriminating functions. The discriminating functions corresponding to above intervals of a are given in Table 1 shown in FIG. 4. The discriminating functions defined above work best for any $\alpha \geq 1$. However, for vertically downscaled videos with factor $\alpha < 1$, due to the merging of original and interpolated grids, these functions become less effective. If $\alpha < 0.95$ then $D_{1,\alpha}(y,n)$ is replaced by its more efficient temporal analog $D'_{1,\alpha}(y,n)$ (though it is less efficient for $\alpha > 0.95$)

$$D'_{1,\alpha}(y, n) = \frac{L}{w} \sum_{x \in L \cdot N_o} (\text{sign}(\Delta_{-2 \cdot \alpha, 0}(x, y, n)) - \text{sign}(\Delta_{-2 \cdot \alpha, 0}(x, y, n-1)))$$

As before, the sum is analyzed $$D_\alpha(y, n) = \sum_i \kappa_i D_{i,\alpha}(y, n),$$

where $D_{2,\alpha}(y,n)$ can be excluded without substantially sacrificing detection quality.

If the video is de-interlaced and scaled factor $\beta$ then for any $\alpha$ sufficiently close to $\beta$, $D_\alpha(y,n)$ as the function of y, should contain essential amount of the highest spatial-temporal harmonic $$g(\alpha, y, n) = c_\alpha \exp(i\pi(\alpha \cdot y + n)),$$

where $c_\alpha$ is the amplitude coefficient which depends on the cropping method (if the video was cropped after scaling) and the visibility of de-interlacing artifacts.

In order to find the scaling ratio $c_\alpha$ of de-interlaced video we evaluate the amplitude of the scaling spectrum $\rho(\alpha)$ $$\rho(\alpha) = |S|^{-1} \left\| \sum_{(y,n) \in S} D_\alpha(y, n) \cdot \exp(-i\pi(\alpha \cdot y + n)) \right\|,$$

for a given set/interval of candidate $\alpha$ where S is some sub-grid of vertical-temporal pixel grid such that S contains the equal number of points from odd and even grids.

If the video is de-interlaced and scaled factor $\beta$ then the scaling spectrum $\rho(\alpha)$ as function of $\alpha$ should have a well pronounced peak at $\alpha=\beta$.

FIG. 6 illustrates the amplitude of two scaling spectra of a sample video frame scaled with ratio 1.05. The top sequence is de-interlaced with an advanced de-interlacer; the bottom is original progressive. The first spectrum is very narrow, the dominating frequency has significant amplitude, and it corresponds to the scaling ratio.

FIG. 6 suggests discriminating de-interlaced and progressive spectra based on the amplitude of dominating frequency $$\text{Max} = \max_\alpha \rho(\alpha),$$

and the spectrum variance $$\text{Var} = \sqrt{\frac{1}{|\{\alpha\}|} \sum_{\{\alpha\}} (\rho(\alpha))^2 - \left(\frac{1}{|\{\alpha\}|} \sum_{\{\alpha\}} \rho(\alpha)\right)^2},$$

where $\{\alpha\}$ is the set/interval of candidate scaling factors, $|\{\alpha\}|$ is the total number of frequencies in this set/interval. FIG. 2 is a plot on loglog scale (maximum, variance) of points for a number of video frames samples from different sequences and scaled with ratio 0.96. The top points correspond to de-interlaced sequences, and the bottom points to original progressive. Points are grouped in two distinct sets which can be efficiently separated by line $$\log(\text{Max}) = c_1 \cdot \log(\text{Var}) + c_2,$$

or by $$\text{Max} = e^{c_2}(\text{Var})^{c_1},$$

on normal scale where $c_1$ and $c_2$ are come parameters.
The video is classified as progressive if $$\text{Max} < e^{c_2}(\text{Var})^{c_1},$$

otherwise video is classified as de-interlaced and scaled with factor $$\hat{\beta} = \underset{\alpha}{\text{argmax}}\, \rho(\alpha).$$

The proximity with the discriminating line $\text{Max} = e^{c_2}(\text{Var})^{c_1}$, can be converted to a so-called de-interlaced and scaled (DISC) measure $$M_{DISC} = \frac{\text{Max} \cdot (\text{Var})^{-c_1'}}{e^{c_2} + \text{Max} \cdot (\text{Var})^{-c_1'}},$$

which takes values close to 0 on progressive video, values close to one on de-interlaced videos, and ≈0.5 on the discriminating line.

The positions corresponding to original lines in the scaled content can be determined as maxima of $$\cos(\pi(\beta y + n) + \phi(\beta)),$$

i.e.

$$y_k = \frac{1}{\beta}\left(2k - \frac{\varphi(\beta)}{\pi} - n\right),$$

k=0, 1, 2 ...
where $\phi(\beta)$ is the phase of the scaling spectrum $$\varphi(\beta) = \arg\left(|S|^{-1} \sum_{(y,n) \in S} D_\beta(y, n) \cdot \exp(-i\pi(\beta \cdot y + n))\right).$$

The detection method described above has natural limitations. First it is not very robust for scaling factors below 0.95. Second, if the method can detect the presence of de-interlacing and scaling, it cannot discriminate between the scaling with ratio $\beta = 1+\epsilon$ and ratio $\beta = 1-\epsilon$. Indeed, since $$g(1+\epsilon, y, n) = c_\alpha \exp(i\pi((1+\epsilon) \cdot y + n)) = -c_\alpha \exp(i\pi((1-\epsilon) \cdot y + n)) = -g(1-\epsilon, y, n),$$

then up-scaling with $\beta = 1+\epsilon$ and down scaling with $\beta = 1-\epsilon$ will cause the appearance of the same spatial-temporal harmonic in $D_\beta(y,n)$ (differences in phase are not discriminated which can be caused by cropping or different phase of interlacing). If the same discriminating function $D_\alpha(y,n)$ is used for $\alpha \approx 1$ then the scaling spectrum $\rho(\alpha)$ is also symmetric around $\alpha \approx 1$.

$$\rho(1+\varepsilon) = |S|^{-1} \left\| \sum_{(y,n) \in S} D_{1+\varepsilon}(y, n) \cdot \exp(-i\pi((1+\varepsilon) \cdot y + n)) \right\|$$

$$= |S|^{-1} \left\| \sum_{(y,n) \in S} D_{1+\varepsilon}(y, n) \cdot (-1)^{n+y} \exp(-i\pi\varepsilon y) \right\|$$

$$= |S|^{-1} \left\| \sum_{(y,n) \in S} D_{1-\varepsilon}(y, n) \cdot (-1)^{n+y} \exp(i\pi\varepsilon y) \right\|$$

$$= |S|^{-1} \left\| \sum_{(y,n) \in S} D_{1-\varepsilon}(y, n) \cdot \exp(-i\pi((1+\varepsilon) \cdot y + n)) \right\|$$

$$= \rho(1-\varepsilon).$$

Below, the most straightforward applications of the DISC detector are discussed. This list in not exhaustive, however, and other interesting applications may still exist.

1) Quality evaluation. Since the DISC value correlates with visibility of de-interlacing artifacts, it can be used for comparison of different de-interlacing techniques and for quality evaluation of particular de-interlacers; see FIGS. 7a-7c.

2) Video compression. The DISC detector can be used to select the optimal compression strategy. For example, if the video is poorly de-interlaced, at least one of a higher compression ratio and extra quality can be achieved if it is compressed as interlaced video. Note that proper re-interlacing is only possible for non-scaled video, as it requires the positions of original and interpolated lines to be located on an integer grid;

3) Film cadence detection. In film cadence detection, it is essential to identify the presence and location of repeated frames. Unfortunately, due to poor de-interlacing, repeated frames can differ with respect to each other. Together with compression artifacts, this makes film detection quite a challenging task. Since the DISC value indicates the amount of de-interlacing artifacts, it can be used to determine how much frame difference can be tolerated to classify two de-interlaced frames as a repeat.

4) Sharpness enhancement control. If a sharpness enhancement algorithm is applied to a video with visible de-interlacing artifacts, it clearly increases the sharpness of the artifacts as well. Since the DISC value correlates with visibility of de-interlacing artifacts, it can be used to adjust the parameters of sharpness enhancement algorithms. Furthermore, since the locations of the original and interpolated pixels are known, the algorithm can be altered to apply more sharpness enhancement on the original lines and less on the interpolated lines.

5) Re-(de)-interlacing. Suppose the front end receives a video in progressive format and has a good de-interlacer on board. It is possible to tune the DISC detector such that it can robustly identify whether the video is occasionally de-interlaced with pure line insertion or pure line repetition. Then if there is no scaling detected, it is possible to interlace video (select original lines) and re-de-interlace it with the de-interlacer of the present invention.

6) Post-processing of film content. The DISC detector is especially efficient in combination with film detector. The film detector alone already provides an excellent opportunity for temporal post-filtering of poorly de-interlaced and scaled film content. If n frames are classified as n copies of one original film frame, subject compression and de-interlacing artifacts, each of these n frames can be replaced by the pixel-wise average of these frames. This simple operation removes the most annoying detail flicker and restores some high frequencies lost in individual de-interlaced frames. However the output is still not as sharp as the original. The usage DISC detector in combination with film detector can give us further improvements since it is possible to determine the approximate positions the original lines. Due to possible scaling some of the output lines fall on the original lines, and some fall in-between. The idea is to bias the pixel-wise average of repeats towards the original lines so that the distribution of weights becomes dependent on parity and the vertical position of the current frame. Hence, at vertical positions where the output pixels fall on the original lines perfect reconstruction is possible. In this case the weights are concentrated either on odd or on even frame repeats depending on which contain the original line, i.e., the re-de-interlacing is actually done. If there is no scaling and at least one repeat then the perfect reconstruction is possible for the whole frame. If there is scaling and the output pixels fall precisely in-between two original lines then we assign equal weights in the pixel-wise average as the best possible solution. Hence, in the case of scaling when the output lines periodically fall on and in-between the original lines improvement over the flat pixel-wise average is also periodically changes with vertical positions. However this periodicity being static does not disturb the perception of the general quality improvement. FIGS. 8a and 8b illustrate the advantages of re-de-interlacing over the flat pixel-wise average of the detected frame repeats.

FIG. 9 illustrates an example of an apparatus that comprises modules that perform:

a) Discrimination Function Module (901): evaluation of so-called discriminating function D(y,n) for given set of lines (y,n)∈S where discriminating function D(y,n) is based on local spatial and/or temporal pixel correlations;

b) Grid Determination Module (902): determination of an even grid to consist of the lines with line number y in frames with frame number n where sum y+n is even number and an odd grid to consist of the lines with line number y in frames with frame number n where sum y+n is odd c) Averaging Module (903) computation of an average A1 of discriminating function D(y,n) on subset of pixels belonging to even grind and an average A2 of discriminating function D(y,n) on subset of pixels belonging to odd grid where the even grid consist of the lines with line number y in frames with frame number n where sum y+n is even number and the odd grid consist of the lines with line number y in frames with frame number n where sum y+n is odd.

d) Comparison/classification Module (904): Comparison of the averages A1 and A2 and based on their difference computing and outputting a de-interlacing quality measure; and classifying the even grid as the grid of original lines if A1>A2, otherwise classifies odd grid as grid of original lines.

While various embodiments herein have been discussed with reference to DISC, these are exemplary and for illustrative purposes only. The general concepts of DISC can be realized with equivalent component. Furthermore, the DISC can be implemented using hardware, software or a combination thereof. The variety of devices that can benefit from DISC are too numerous to fully elaborate but include those mentioned in the above disclosure, at a minimum, as well as Blue Ray players, DVD players, televisions and displays, personal computers, portable video players, codecs, etc. Therefore, it will be appreciated by one skilled in the art that various changes can be made to the DISC disclosed herein without departing from the spirit and scope of the invention as defined by the appended claims and their equivalents.

What is claimed is:

1. A method for detecting de-interlacing for scaled video, comprising:

for every scaling ratio $\alpha$ of a given set $\alpha \in I$ computing a measure, $\rho(\alpha)$ which indicates the visibility of de-interlacing artifacts given that the content was scaled with vertical factor $\alpha$, by performing the following:

a. evaluating a pre-set discriminating function $D_\alpha(y,n)$ for a given set of lines $(y,n) \in S$, and b. convolving the discriminating function $D_\alpha(y,n)$ with a pre-set parity function which uses $\alpha$ as a scaling coefficient;

analyzing the measure $\rho(\alpha)$ and defining a de-interlacing quality measure Q that is inversely proportional to visibility of peak(s) in $\rho(\alpha)$ as a function of $\alpha$;

analyzing the measure $\rho(\alpha)$ and defining the most probable vertical scaling ratio $\beta$ as $\alpha$ corresponding to the maximum of $\rho(\alpha)$; and defining the positions corresponding to original lines in the scaled content as maxima of $\cos(\pi(\beta y+n)+\phi(\beta))$.

2. The method of claim 1 wherein evaluating further comprises evaluating pre-set discriminating function $D_\alpha(y,n)$ for given set of lines $(y,n) \in S$ where discriminating function $D_\alpha(y,n)$ is based on local spatial and/or temporal pixel correlations.

3. The method of claim 1, wherein where the pre-set discriminating function D(y,n) is based on a weighted sum of different specific discriminating functions.

4. The method of claim 1 where de-interlacing quality measure Q is computed as function of variance and the maximum of the scaling spectrum.

5. The method of claim 2 wherein convolving further comprises convolving the evaluated discriminating function $D_\alpha(y,n)$ with pre-set parity function $\exp(-i\pi(\alpha \cdot y+n))$ where $\alpha$ is a scaling coefficient, y is a line number, and n is a frame number to determine the measure $\rho(\alpha)$ $$\rho(\alpha) = |S|^{-1} \left\| \sum_{(y,n) \in S} D_\alpha(y,n) \cdot \exp(-i\pi(\alpha \cdot y + n)) \right\|,$$

and phase $$\varphi(\alpha) = \arg\left( |S|^{-1} \sum_{(y,n) \in S} D_\alpha(y,n) \cdot \exp(-i\pi(\alpha \cdot y + n)) \right).$$

6. The method of claim 1, wherein convolving further comprises convolving the evaluated discriminating function $D_\alpha(y,n)$ with pre-set parity function $\exp(-i\pi(\alpha \cdot y+n))$ where $\alpha$ is a scaling coefficient, y is a line number, and n is a frame number to determine the measure $\rho(\alpha)$ $$\rho(\alpha) = |S|^{-1} \left\| \sum_{(y,n) \in S} D_\alpha(y,n) \cdot \exp(-i\pi(\alpha \cdot y + n)) \right\|,$$

and phase $$\varphi(\alpha) = \arg\left( |S|^{-1} \sum_{(y,n) \in S} D_\alpha(y,n) \cdot \exp(-i\pi(\alpha \cdot y + n)) \right).$$

7. The method of claim 1, wherein where the pre-set discriminating function D(y,n) is based on a weighted sum of different specific discriminating functions.

8. The method of claim 7 wherein the pre-set discriminating function D(y,n) further comprises at least one of specific discriminating function proportional to a relative/additional amount of high frequency detail in the given line n with respect to a specific neighboring line in an analyzed previous or next frame.

9. A video processing apparatus comprising, a plurality of modules configured for detection of de-interlacing for scaled video having a vertical scaling factor α, including:
   a de-interlacing artifact visibility detection module comprising sub modules:
      a. a discrimination function module that performs a pre-set discriminating function $D_\alpha(y,n)$ on a subset of the set of lines (y,n)∈S where n is a specific frame number and y is a line number within the specified frame, and
      b. a convolving discriminating function module that convolves the discriminating function $D_\alpha(y,n)$ using a pre-set parity function which uses α as a scaling coefficient to obtain ρ(α) which indicates the visibility of de-interlacing artifacts;
   a de-interlacing quality definition and analysis module that analyzes the measure ρ(α) and defines a de-interlacing quality measure Q that is inversely proportional to visibility of peak(s) in ρ(α) as a function of α, defines the most probable vertical scaling ratio β as α corresponding to the maximum of ρ(α) and defines the positions corresponding to original lines in the scaled content as maxima of cos(π(βy+n)+φ(β)); and
   wherein the video processing apparatus adjusts video output in response to results generated by the modules.

10. The video processing apparatus of claim 9 wherein evaluating further comprises evaluating pre-set discriminating function $D_\alpha(y,n)$ for given set of lines (y,n)∈S where discriminating function $D_\alpha(y,n)$ is based on local spatial and/or temporal pixel correlations.

11. The video processing apparatus of claim 9, wherein where the pre-set discriminating function D(y,n) is based on a weighted sum of different specific discriminating functions.

12. The video processing apparatus of claim 9 where de-interlacing quality measure Q is computed as function of variance and the maximum of the scaling spectrum.

13. The video processing apparatus of claim 9 wherein convolving further comprises
   convolving the evaluated discriminating function $D_\alpha(y,n)$ with pre-set parity function exp(−iπ(α·y+n)) where α is a scaling coefficient, y is a line number, and n is a frame number to determine the measure ρ(α)

$$\rho(\alpha) = |S|^{-1} \left\| \sum_{(y,n)\in S} D_\alpha(y,n) \cdot \exp(-i\pi(\alpha\cdot y + n)) \right\|,$$

and phase $$\varphi(\alpha) = \arg\left( |S|^{-1} \sum_{(y,n)\in S} D_\alpha(y,n) \cdot \exp(-i\pi(\alpha\cdot y + n)) \right).$$

14. The video processing apparatus of claim 9, wherein convolving further comprises convolving the evaluated discriminating function $D_\alpha(y,n)$ with pre-set parity function exp (−π(α·y+n)) where α is a scaling coefficient, y is a line number, and n is a frame number to determine the measure ρ(α)

$$\rho(\alpha) = |S|^{-1} \left\| \sum_{(y,n)\in S} D_\alpha(y,n) \cdot \exp(-i\pi(\alpha\cdot y + n)) \right\|,$$

and phase $$\varphi(\alpha) = \arg\left( |S|^{-1} \sum_{(y,n)\in S} D_\alpha(y,n) \cdot \exp(-i\pi(\alpha\cdot y + n)) \right).$$

15. The video processing apparatus of claim 14 wherein the pre-set discriminating function D(y,n) further comprises at least one of specific discriminating function proportional to a relative/additional amount of high frequency detail in the given line n with respect to a specific neighboring line in an analyzed previous or next frame.

16. A system for compression/transmission/storage of a video signal where an optimal compression/transmission/storage strategy is determined based on a value of a de-interlacing quality measure Q computed using an included DISC detector apparatus configured in accordance with
   a module that performs a pre-set discriminating function D(y,n) on a subset of the set of lines (y,n)∈S where n is a specific frame number and y is a line number within the specified frame,
   a grid determination module that defines an odd grid as a subset of pixels consisting of lines (y,n)∈S with line number y in frames with frame number n where sum y+n is odd and defining an even grid as a subset of pixels consisting of lines (y,n)∈S with line number y in frames with frame number n where sum y+n is even;
   an averaging module that computes an average A1 by executing the discriminating function D(y,n) on the pixels belonging to the even grid and average A2 by executing the discriminating function D(y,n) on a the pixels belonging to the odd grid;
   a comparison module that outputs a de-interlacing quality measure based on a comparison between the values A1 and A2; and
   a classification module that classifies the even grid as the grid of original lines if A1>A2, and otherwise classifies the odd grid as the grid of original lines,
wherein the system comprises:
   a front-end module to receive and de-interlaced an interlaced video or receive a progressive signal; the DISC detector apparatus configured to compute and output a quality measure Q of the de-interlacing and to determine and classify even and odd grids wherein one of said even and odd grid is a grid of original lines of the input video signal;
   a video engine to reconstruct, store in long term storage, and output to a screen the original video stream from the even and odd grids and the quality measure Q; and
   a display to receive and display the reconstructed video stream.

17. A system for enhancement of an input video signal where the strength of enhancement depends on a de-interlacing quality measure Q and at least one of position and proximity of the original lines both computed by an included DISC detector apparatus;

the DISC detector apparatus configured in accordance with
a module that performs a pre-set discriminating function D(y,n) on a subset of the set of lines (y,n)∈S where n is a specific frame number and y is a line number within the specified frame,
a grid determination module that defines an odd grid as a subset of pixels consisting of lines (y,n)∈S with line number y in frames with frame number n where sum y+n is odd and defining an even grid as a subset of pixels consisting of lines (y,n)∈S with line number y in frames with frame number n where sum y+n is even;
an averaging module that computes an average A1 by executing the discriminating function D(y,n) on the pixels belonging to the even grid and average A2 by executing the discriminating function D(y,n) on a the pixels belonging to the odd grid;
a comparison module that outputs a de-interlacing quality measure based on a comparison between the values A1 and A2; and
a classification module that classifies the even grid as the grid of original lines if A1>A2, and otherwise classifies the odd grid as the grid of original lines,
the DISC detector apparatus to compute and output a quality measure Q of the de-interlacing and classify even and odd grids wherein one of said even and odd grid is a grid of original lines of the input video signal and to determine position/proximity of original lines;
a video engine to reconstruct and output the original video stream from lines of at least one of the even and odd grids, at least one of position and proximity of said lines in said grids and the quality measure Q; and
a display to receive and display the reconstructed video stream.

18. A system for motion detection in an input video signal where thresholds and parameters are set depending on a de-interlacing quality measure Q computed by an included DISC detector apparatus;
the DISC detector apparatus configured in accordance with
a module that performs a pre-set discriminating function D(y,n) on a subset of the set of lines (y,n)∈S where n is a specific frame number and y is a line number within the specified frame,
a grid determination module that defines an odd grid as a subset of pixels consisting of lines (y,n)∈S with line number y in frames with frame number n where sum y+n is odd and defining an even grid as a subset of pixels consisting of lines (y,n)∈S with line number y in frames with frame number n where sum y+n is even;
an averaging module that computes an average A1 by executing the discriminating function D(y,n) on the pixels belonging to the even grid and average A2 by executing the discriminating function D(y,n) on a the pixels belonging to the odd grid;
a comparison module that outputs a de-interlacing quality measure based on a comparison between the values A1 and A2; and
a classification module that classifies the even grid as the grid of original lines if A1>A2, and otherwise classifies the odd grid as the grid of original lines,
the DISC detector apparatus to compute and output a quality measure Q of the de-interlacing and classify even and odd grids wherein one of said even and odd grid is a grid of original lines of the input video signal and to determine position/proximity of original lines;
a video engine to reconstruct and output the original video stream from at least one of the even and odd grids, the position/proximity thereof and the quality measure Q; and
a display to receive and display the reconstructed video stream.

* * * * *